No. 816,382. PATENTED MAR. 27, 1906.
F. E. SCHAAL.
CULTIVATOR.
APPLICATION FILED AUG. 17, 1905.

2 SHEETS—SHEET 1.

Witnesses
C. K. Reichenbach
E. M. Colford

Inventor
F. E. Schaal

Chandlee & Chandlee
Attorneys

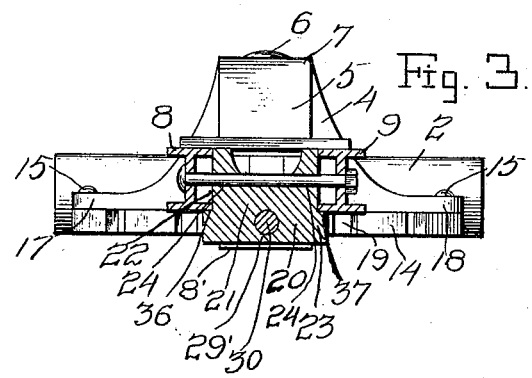
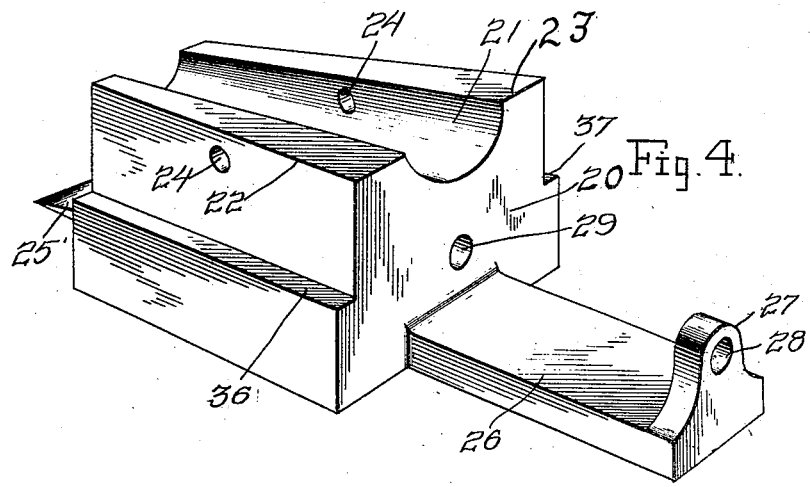
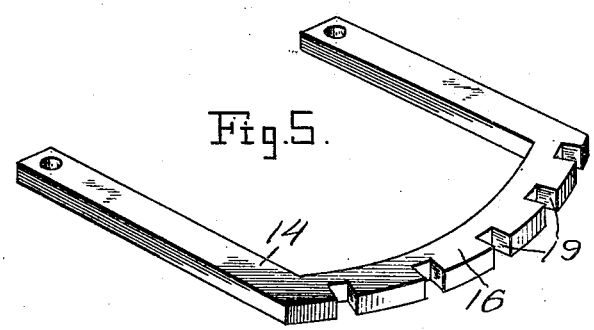

UNITED STATES PATENT OFFICE.

FREDERICK E. SCHAAL, OF SEWARD, NEBRASKA.

CULTIVATOR.

No. 816,382.

Specification of Letters Patent.

Patented March 27, 1906.

Application filed August 17, 1905. Serial No. 274,545.

*To all whom it may concern:*

Be it known that I, FREDERICK E. SCHAAL, a citizen of the United States, residing at Seward, in the county of Seward, State of Nebraska, have invented certain new and useful Improvements in Cultivators; and I do hereby declare the following to be a full, clear, and exact description of the invention, such as will enable others skilled in the art to which it appertains to make and use the same.

This invention relates to cultivator attachments.

The object of the invention is to provide an attachment for wheel-cultivators which may be swung to and maintained at various angles, the means for holding the attachment in its adjusted position being operable from the handle of the implement.

Another object of the invention resides in the provision of an exceedingly simple, inexpensive, durable, and efficient attachment of the nature stated embodying such characteristics that it may be readily attached to or detached from any of the wheeled cultivators now in use.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

Figure 1:
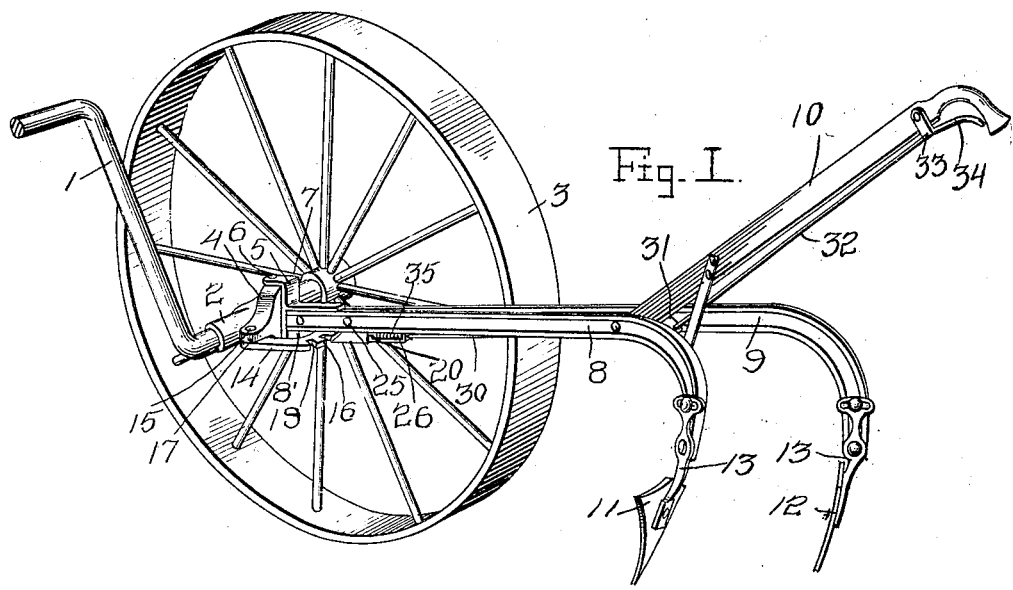
Figure 2:
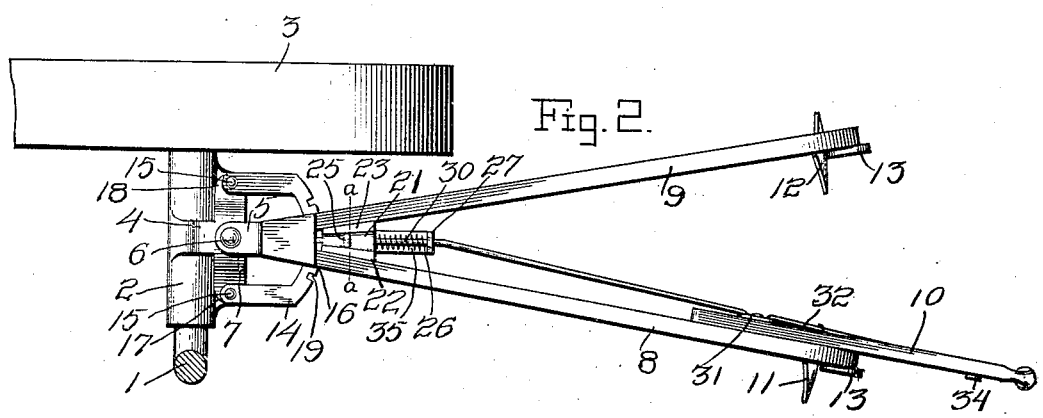

In the drawings, Figure 1 is a perspective view of a portion of a cultivator embodying my invention. Fig. 2 is a top plan view. Fig. 3 is a sectional view through the beams and casting on the line *a a* of Fig. 2. Fig. 4 is a detail view of the casting detached from the cultivator. Fig. 5 is a detailed view of the U-shaped toothed plate.

Referring now to the drawings, there is shown a portion of a wheeled cultivator, the reference character 1 designating a crank-axe provided at one end with a sleeve 2, adjacent which and mounted upon the extremity of the axle 1 is a ground-wheel 3. Mounted upon this sleeve 2 is a beam-coupling member comprising the parts 4 and 5, coupled together by means of a suitable pivot-pin 6. The part 5 of the coupling has upper and lower ears 7 and 8', between which are fitted the forward ends of the beams 8 and 9 in any suitable manner. By reason of this pivotal connection of the parts 4 and 5 of the coupling the beams 8 and 9 are permitted to move laterally of the cultivator at both sides thereof, it being understood that there is another pair of beams at the opposite side of the crank-axle 1 of the cultivator.

By reason of the two sets of beams, which are designed to work upon opposite sides of rows of corn or other vegetables, there is in the use of the cultivator, by reason of inequalities of ground, more or less side draft, necessitating constant attention on the part of the operator, who is compelled to frequently right the beams with reference to the rows of vegetables by pulling accordingly upon the handles 10 of the cultivator. Such attention to the cultivator and movements of the handles is a constant strain upon the operator, and my invention is therefore intended principally to offset the strain and unnecessary labor. In other words, in order to obviate the necessity of continually righting the position of the beams and their points 11 and 12, respectively, which are secured to the standards 13 of each beam, and to also obviate the strain upon the operator I secure to the under faces of the beams 8 and 9 a U-shaped plate 14, whose legs are secured, by means of suitable bolts 15, to the ears 17 and 18 of the coupling member 4, with its bight portion 16 provided with a series of teeth 19, which latter are disposed in a direction of the cultivator-points 11 and 12.

It will be seen that the inner ends of the cultivator-beams 8 and 9 converge to a meeting-point, and in the space between the beams 8 and 9 immediately in the rear of their meeting engagement I secure the upper longitudinal grooved portion 21 of the casting 20 of my improvement. By reason of the longitudinal grooves 21 of the casting 20 two walls 22 and 23 result, which walls are provided with alining perforations 24 for the reception of a suitable bolt 25, which passes therethrough and also through the corresponding beams 8 and 9 for securing the casting 20 between the latter. This casting 20 is placed in such position with respect to the beams and the U-shaped plate 14 as to permit the beveled tongue 25' at one end thereof to fit beneath the U-shaped plate 14 and assist in supporting the same beneath the beams 8 and 9. The end of the casting 20 opposite the lip 25' is extended beyond the walls 22 and 23 and beneath the bottom of the grooves 21, as indicated by the reference character 26, and terminates in a short upright projection 27, provided with a perforation 28. This perforation 28 of the short upright 27 is arranged in direct alinement with the longitudinal bore 29 of the casting 20, the bottom of said bore being in alinement with the upper face of the inner end of the lip 25', with its top beneath the bottom of the longitudinal groove or bifurcation 21.

Fitted for sliding movement in the bore 29 and through the perforation 28 of the short upright 27 is a rod 30, which latter extends rearwardly to the lower end of the handles, where it is pivoted to one end of the angleplate 31, which latter is pivoted to the handle, with its opposite end connected to a rod 32, which latter has its opposite end engaged in the eye 33 of the handle-lever 34, which latter is pivotally secured in any suitable manner near the upper end of the corresponding handle.

The rod 30 is held normally in engagement at its free end with the teeth 19 of the U-shaped plate 14 by means of a helical spring 35 encircling the same between the short upright 27 and the corresponding end of the walls 22 and 23 of the casting 20. However, when it is desired to disengage the rod 30 from the teeth 19 of the U-shaped plate 14 pressure upon the hand-lever 34 toward the handle of the cultivator will pull the rod 30 out of engagement with the teeth against the action of the spring 35 and permit a shifting of the beams with respect to a pivotal movement of the part 5 with the part 4 of the coupling aforesaid. It will be apparent, therefore, that when the cultivator is to operate upon opposite sides of the row and evenly therewith the rod 30 is engaged with the proper tooth 19 of the U-shaped member 14, and thereby hold the beams and the coupling in one position with respect to the axle of the cultivator.

From the foregoing it will be seen that my improved attachment is very simple, and consequently inexpensive of manufacture, and I desire to call attention to the fact that by reason of the taper of the casting 20 the same may be wedged tightly between the beams 8 and 9, with the shoulders 36 and 37 of the casting held tightly against the lower faces of the respective beams, as clearly shown in the drawings.

What is claimed is—

A device of the character described comprising a casting having a lip projecting from one end and an extension at the opposite end provided with a perforated upright, the said casting having a longitudinal bore throughout its length above the level of the upper faces of the said lip and extension, a rod mounted for sliding movement through said bore, and a spring encircling the rod between the casting and said upright.

In testimony whereof I affix my signature in presence of two witnesses.

FRED. E. SCHAAL.

Witnesses:
J. W. OCKEN,
WM. KETELS.